United States Patent Office 2,931,234
Patented Apr. 5, 1960

2,931,234

VARIABLE SPEED FRICTION DRIVE TRANSMISSION UNITS

Albert John Hayward, Colchester, England, assignor to The George Cohen 600 Group Limited, London, England, a British company Application August 21, 1958, Serial No. 756,474

Claims priority, application Great Britain November 12, 1957

7 Claims. (Cl. 74—200)

This invention relates to friction drive transmission units, capable of transmitting drive from a driving shaft to a driven shaft at ratios infinitely variable between maximum and minimum values.

The invention is particularly concerned with improvements in friction drive transmission units of the kind which incorporate the following features:

(a) Coaxial driving and driven shafts;

(b) Driving and driven elements respectively carried on said shafts in drive-transmitting relationship therewith, said elements having annular friction drive surfaces (herein called "rims");

(c) A set of spherical bodies (at least three in number) uniformly spaced circumferentially about the common axis of said elements, the areas of contact between the rims and the spherical bodies being disposed in axially spaced planes normal to the common axis of the rotatable elements;

(d) A rotatable pressure member reacting on the spherical bodies in opposition to said rims and positioned in a plane between said axially spaced planes, said pressure member acting to retain the spherical bodies in frictional engagement with the said rims;

(e) Each of the spherical bodies being rotatable on an axle projecting from opposite sides of the respective body for slidable engagement with arcuate radially disposed guides formed in or carried by a casing enclosing the transmission unit;

(f) Each said axle also possessing a spherical-surfaced enlargement engaging a slot in a substantially annular "iris" plate concentric with the axis of said shafts and disposed at one side of the spherical bodies and conforming substantially to the curvature thereof;

(g) The slots in the "iris" plate being shaped so that, on angular movement of the "iris" plate about the axis of the shafts, the axles of the spherical bodies are tilted in unison in radial planes with respect to the said driving and driven elements;

(h) Drive being transmitted from one shaft through the appropriate driving element and by frictional contact from such element through the spherical bodies, reacting against the pressure member, to the other element;

(i) Whereby angular movement and tilting of the axles of the spherical bodies will alter the ratio of drive from one of said elements to the other and hence from one shaft to the other.

Friction drive transmission units of this general kind are at present in extensive use for (inter alia) speed control of machine tools such as lathes, and an example of such a drive is disclosed in United States Patent No. 2,469,653. In that specification, the rotatable pressure member takes the form of an enclosing ring encircling the spherical bodies and holding them inwardly against the radially outward thrust of the rims of flanged driving and driven elements which are of equal diameter, said ring being disposed in a plane midway between the planes of contact between the rims and the spherical bodies so that the forces acting on the spherical bodies are symmetrically disposed and balanced.

By providing the slots in the "iris" plate of suitable cam formation, variation of speed in exact geometrical progression relative to angular movement of the "iris" plate can be obtained, in which case the friction drive transmission units are widely applicable for use in connection with machine tools of all kinds, paper-making, textile and printing machinery, mixing machines, conveyors, automatic stokers with remote control, and many other applications where an effective infinitely variable drive transmission is advantageous.

The slots in the "iris" plate also can be shaped to such a cam formation as to give variation in speed in hyperbolic progression relative to angular movement of the "iris" plate, in which case the friction drive transmission unit can be used, for example, in conjunction with a lathe to enable facing operations to be carried out with a constant cutting speed, the transmission unit being controlled so that the spindle speed of the lathe automatically increases as the tool feeds towards the center.

In the known constructions of friction drive transmission units of the kind referred to, the driving and driven elements are journalled in bearings in opposite sides of a two-part or otherwise separable casing structure of substantially circular formation. This arrangement involves very precise machining of the parts of the casing to ensure that the driving and driven elements are in the precise axial alignment which is essential for effective operation and to avoid the imposition of undue stresses on the bearings and on the casing structure which has to be made sufficiently strong to ensure rigidity in alignment and is therefore relatively heavy. Furthermore, replacement of damaged or defective components requires such a high degree of skill and care that it is generally necessary that repairs or replacements should be carried out by the manufacturers which involves a supply of replacement units in exchange for defective units. Moreover, in the known construction the "iris" plate has to be rotatably located at its periphery within the casing and this involves control means, either in the form of a lever projecting through a slot in the periphery of the casing which is difficult to render oil-tight, or a worm drive arrangement which has the disadvantage that excessive force may be easily applied to the "iris" plate, this being liable to cause damage to components of the unit, it being understood that the pressures between the driving and driven elements, the opposed pressure member and the spherical bodies requisite for effective operation of the unit, are of such high order that, while adjustment of the "iris" plate for effecting change in ratio can be effected by application of a moderate force to the "iris" plate while the drive is being transmitted, a very high degree of force may have to be applied to the "iris" plate to overcome sliding or static friction at the pressure points resisting tilting of the axles of the spherical bodies. Transmission units of the kind referred to can be damaged to an extent to render them unserviceable if excessive operating force is applied to the "iris" plate, for example, while the co-operating elements are not rotating.

The present invention has among its objects to provide an improved construction of friction drive transmission unit of the kind referred to, whereby manufacturing difficulties in securing precise axial alignment of co-operating elements of the unit may be obviated and replacement of damaged or defective components facilitated so that repairs may be carried out, if desired, in situ. Furthermore, the invention has among its objects to provide an improved construction whereby a lighter form of casing may be employed with provision, if desired, for cooling, and an improved arrangement and mounting of the "iris" plate provided, whereby sensitive control thereof, e.g., by application of relative light operating pressure, may be secured. Improved control means for obviating this possibility is the subject of the copending application Serial No. 756,475, filed August 21, 1958.

The term "spherical body" used herein means a body in which the surfaces which are in contact with the friction drive rims of the driving and driven elements and with the pressure member, e.g., the outer retaining ring, throughout the range of inclination of the axle of the body under the control of the "iris" plate, are portions of a sphere.

According to the present invention, in an infinitely variable friction drive transmission unit of the kind referred to, the driving and driven elements are provided on concentric shafts, viz., on an outer tubular shaft journalled in a main end part of the casing of the unit and on an inner shaft extending through the outer shaft and rotatably supported concentrically therewith independently of an opposite end part or cover plate structure of the casing, so that said main end part of the casing supports the whole of the rotatable assembly of the transmission unit, said elements being pressed axially towards one another by the action of automatic pressure-adjusting means arranged so that torsional stress dependent on the load transmitted imparts proportional axial thrust acting to press the driving and driven elements towards one another, the opposite axial thrust forces on the said elements being resolved in the concentric shaft assembly so that the casing is not stressed thereby. Preferably, one of said elements is integral with, or fixedly mounted on, its respective shaft, and the other element is mounted to be rotatable and axially displaceable with respect to its shaft, the automatic pressure-adjusting means being disposed between the displaceable element and an abutment on the respective shaft.

More specifically, according to the present invention, there is provided, in an infinitely variable friction drive transmission unit of the kind referred to, wherein the coaxial driving and driven elements are provided on concentric outer and inner shafts to engage at their peripheries a circumferentially spaced set of spherical bodies disposed between peripheral friction drive rims of the elements and an outer retaining ring, the outer shaft being tubular and the inner shaft extending therethrough, a construction in which the casing enclosing the co-operating elements of the transmission includes a main end part and an opposite cover plate structure, the said main end part supporting the whole rotatable assembly of the transmission unit, the outer tubular shaft being journalled in bearings in the main part of the casing and being integrally, or otherwise fixedly, provided at its inner end with one of said elements, and the inner shaft extending concentrically through the tubular outer shaft being supported concentrically therewith independently of the cover plate structure of the casing, and in which the other of said coaxial elements is so mounted on a portion of the inner shaft extending within the casing as to be rotatable and axially displaceable with respect to said inner shaft, drive between the inner shaft and the element mounted thereon being transmitted by an automatic pressure-adjusting means disposed between an abutment on the inner shaft and the respective element, said pressure-adjusting means being adapted to convert torsional stress into axial thrust so that when drive is being transmitted the coaxial elements are pressed axially towards each other, a thrust bearing being provided between the inner and outer shafts whereby axial pressure exerted by the automatic pressure-adjusting means reacts through the concentric shafts on said elements and through the spherical bodies without stressing the casing.

The automatic pressure-adjusting means may be of the kind comprising a circumferential assembly of balls or rollers rotatable about radial axes and reacting between opposed cam surfaces arranged so that relative rotation of the parts on which the cam surfaces are provided exerts outward axial thrust on said parts.

In a preferred embodiment, the outer end of the inner shaft is journalled concentrically within the tubular outer shaft by a thrust bearing or bearing assembly of the combined axial and radial thrust type, e.g., a taper roller bearing preferably having tubular rollers, or an assemblage including a journal bearing and a thrust bearing. The inner end of the inner shaft may be located concentrically with respect to the outer tubular shaft solely by the self-centering action of the spherical bodies reacting in conjunction with the pressure member, e.g., the outer retaining ring, against the friction drive rims of the coaxial driving and driven elements. If desired, however, the portion of the inner shaft extending within the casing may be journalled in a bearing at or adjacent the inner end of the outer tubular shaft.

According to a further feature of the invention, the "iris" plate may be carried by a spindle or member coaxial with said inner shaft and extending through an axial boss of the cover plate structure for operation by control means.

Advantageously, the casing may be formed of die castings of light metal or metal alloy, in which case the main part, if desired, may have a cylindrical insert in an axial boss to receive the bearings journalling the outer tubular shaft. The arcuate radially disposed guides coacting with the ends of the axles of the spherical bodies may have hardened surfaces or be constituted by inserts or attachments of relatively hard or wear-resisting material. Said inserts or attachments may be of any suitable relatively hard or wear-resisting material, e.g., hardened steel or ceramic material, or wear-resisting or bearing metal or material produced by machining, sintering powdered metals or materials or compounds thereof, or otherwise. Alternatively, the casing may be formed of metal pressings with or without said inserts or attachments.

Means may be provided for cooling the casing. For example, a pulley mounted on the outer end of the tubular shaft may comprise a bladed fan structure arranged to direct cooling air currents over the main part of the casing, in which case the main part of the casing may be provided with fins and an outer wall adapted to provide air ducts for directing air flow from the fan structure over the main part of the casing.

The casing may be provided at the top with means for mounting the unit so as to be capable of angular adjustment for drive-tensioning purposes, and the cover plate structure may be provided at its lower part with an arcuate window for observing oil level within the casing.

The invention includes the combination with a machine, particularly a machine tool, such as a lathe, of an infinitely variable friction drive transmission unit as hereinbefore defined.

The invention is hereinafter described, by way of example, with reference to the accompanying diagrammatic drawings, in which.

Figure 3:
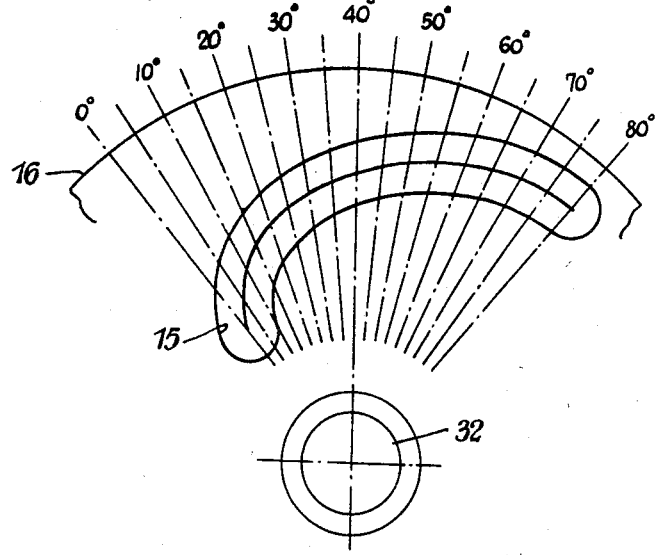
Figure 4:
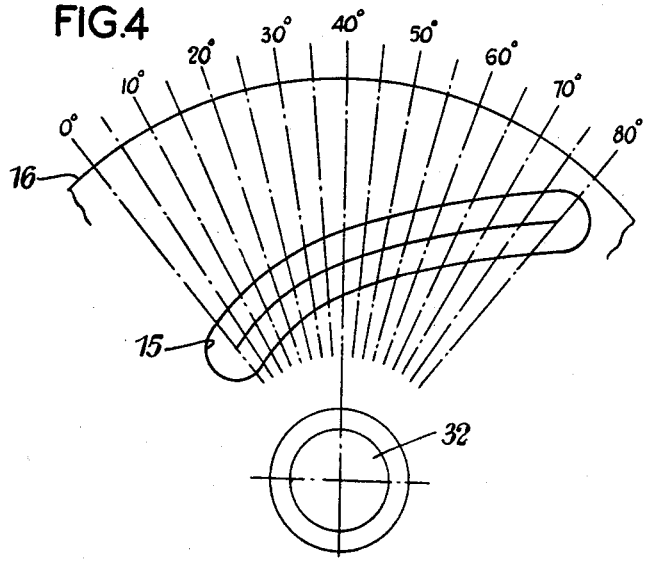

Fig. 3 is a detail view showing the approximate cam formation of the slots in the "iris" plate for obtaining variation in speed in geometrical progression in relation to angular movement of the "iris" plate; and Fig. 4 is a detail view showing the approximate cam formation of the slots in the "iris" plate to obtain variation in speed in hyperbolic progression relative to angular movement of the "iris" plate.

In carrying the invention into effect according to one embodiment, the friction drive transmission unit according to the invention is of the known kind comprising coaxial elements 1, 2, one of which is the driving element and the other the driven element, said elements having peripheral friction drive rims 3, 4 respectively, which are spaced apart axially and engaged by spherical bodies 5, at least three and preferably five in number, which are uniformly spaced circumferentially of the friction drive rims 3, 4 and are retained in engagement therewith by an outer freely rotatable ring 6, the inner surface 7 of which conforms to the curvature of the spherical bodies 5. Each of the spherical bodies 5 is rotatable on an axle 8 journalled in bearings 9 in the spherical body 5, the axle 8 having at one projecting end a flat-faced head 10 and at the other projecting end a flat-faced collar 11 engaging respectively with arcuate radially disposed guides 12, 13 in opposite walls of a casing enclosing the co-operating elements. A spherical-surfaced enlargement 14, in the form of a collar on a projecting portion of the axle 8, engages in a slot 15 in an "iris" plate 16, the slot 15 being so shaped that, on angular movement of the "iris" plate 16 about the axis of the unit, the axles 8 are tilted in unison in radial planes with respect to the elements 1, 2 about the axes of the respective spherical bodies 5 to vary the ratio of drive between the elements 1 and 2. The slotted portion of the "iris" plate 16, which is disposed at one side of the spherical bodies 5, conforms substantially to the curvature thereof.

In the known constructions of friction drive transmission units of the kind referred to, the elements 1, 2 are mounted on coaxial shafts journalled in bearings at opposite ends of the casing and projecting therefrom. In a modification, the elements 1, 2 are carried by concentric shafts, i.e., an outer tubular shaft and an inner shaft extending therethrough, but in this case also the shafts are journalled in bearings at opposite ends of the casing, and in order to achieve the precise axial alignment of the rotating parts which is essential for effective operation, and to avoid undue stresses on the bearings and on the casing, very precise machining of the parts of the casing is required and the casing structure as a whole has to be of relatively heavy construction. Furthermore, the "iris" plate has to be rotatably mounted at its periphery within the casing with the attendant disadvantages before referred to. It is also known to arrange a thrust bearing so that oppositely acting axial thrust forces on the shafts are not transmitted to the casing.

According to the present invention, the casing enclosing the co-operating elements of the transmission includes a main end part 17 and an opposite cover plate structure 18, the main end part 17 supporting the whole of the rotatable assembly of the transmission. The element 1 is integrally, or otherwise fixedly, provided on an outer tubular shaft 19 which is journalled in bearings, preferably roller bearings 20, in the main end part 17 of the casing. The other element 2 is mounted on a portion 22 of an inner shaft 21 which extends concentrically through the tubular shaft 19. The element 2 is rotatably and axially slidable on the shaft portion 22 and drive between the shaft 21 and the element 2 is transmitted by automatic pressure-adjusting means of the cam and roller type comprising, for example, a number of radially disposed barrel-shaped rollers 23 located in an apertured ring 24 and engaging oppositely disposed cam faces 25, 26 respectively, on the outer face of the element 2 and the inner face of an abutment 27 in the form of a collar keyed to the end of the shaft 21 and abutting a head portion 28 thereof. The automatic pressure-adjusting means acts in a manner so that on relative rotation between the element 2 and the shaft 21, engagement of the rollers 23 between the cam faces 25, 26 converts torsional stress into axial thrust on the element 2 in a direction towards the element 1, the thrust exerted varying in proportion to the load. Apart from combined rotary and axial movement of the element 2 with respect to the shaft 21 consequent on the operation of the cam and roller pressure-adjusting device, it has been found in practice that when the transmission unit is under heavy load, appreciable distortion of the retaining ring 6 from a true circular form is liable to occur and this results in further axial displacement of the element 2 on the shaft portion 22 consequent on the axial thrust maintained by the cam and roller device. Thus, the element 2 is in no sense fixed in relation to the shaft 21 but has a fully floating action within the limits prescribed by the function of the cam and roller device and the degree of resilience of the retaining ring 6, and changes its position on the shaft 21 in response to any variation in load.

A thrust bearing 29 is provided between the shaft 19 and the shaft 21 so that, for any given axial thrust on the element 2 in a direction towards the element 1, equal opposite thrust reaction on the abutment 27 is transmitted through the shaft 21, thrust bearing 29 and shaft 19 to the element 1. Thus, the pressure-adjusting means has the effect of applying equal and opposite axial thrust forces on the elements 1, 2 in a direction towards one another, whereby the friction drive rims 3, 4 are caused to frictionally engage the spherical bodies 5 with balanced pressures reacting against the freely rotatable retaining ring 6 to give effective transmission of power at all ratios determined by angular adjustment of the "iris" plate 16.

The thrust bearing 29 preferably is of the taper roller type having tubular rollers to obviate oil-pumping action, and disposed adjacent the outer end of the shaft 19 so as to serve also for journalling the outer end of the shaft 21 concentrically within the shaft 19. Alternatively, a bearing assembly comprising a journal bearing and a thrust bearing may be used in a similar manner. The shaft 21 also may be journalled within the inner end of the shaft 19 by means of a roller bearing 30, but this bearing 30 is not essential. Owing to the symmetrical distribution of the pressures acting on the spherical bodies 5, the latter, reacting in conjunction with the retaining ring 6 against the friction drive rims 3, 4, have a self-centering action on the element 2, whereby the inner end of the shaft 21 will be maintained concentric with the shaft 19.

Inasmuch as the concentric shafts 19, 21 are supported solely by the main end part 17 of the casing, the "iris" plate 16 may extend from a hollow central portion 31 mounted on a spindle or member 32 coaxial with the shaft 21 and journalled in a bearing sleeve 33 in a boss 34 of the cover plate structure 18 to extend therethrough for connection of any suitable control means, such as described in the copending application Serial No. 756,475, filed August 21, 1958.

The inner shaft 21 may be fitted at its outer end with a pulley 35 of V belt or other suitable type, and the shaft 19 similarly may be fitted wtih a pulley 36, the pulleys 35, 36 being keyed to the respective shafts 21 and 19 and retained in conventional manner. The pulley 36 may comprise a bladed fan structure 37 for creating cooling air currents over the main end part 17 of the casing.

The two parts of the casing may be constructed of sheet metal pressings, or, as shown, of die castings of light metal, such as aluminum or alloy thereof. A die cast main part may be combined with a cover plate structure formed as a pressing. For receiving the bearings 20 journalling the shaft 19, a cylindrical sleeve insert 38 may be inserted in an axial bore in a boss 39 on the main end part 17 of the casing, the sleeve insert 38 having at its outer end a flange 40 whereby it may be secured in the boss 39 by means such as screws 41. Outer races 42 of the bearings 20 and an intermediate spacer sleeve 43 may be positioned between an abutment 44 at the inner end of the sleeve insert 38 and a ring 45, by means of an outer ring 46 abutting the flange 40 of the sleeve insert 38 and secured in position by means of screws 47.

The main end part 17 of the casing may be provided with fins 48 and an outer wall 49 adapted to provide substantially radial or spirally extending air ducts 50 for directing air flow from the fan structure 37 over the main end part 17 of the casing.

The arcuate radially disposed guides 12, 13 also may be provided as inserts in the die castings, the inserts being of any suitable metal or material possessing the requisite strength and/or resistance to wear. Instead of using inserts, the guides 12, 13 may be provided by slots in the die castings having the wearing surfaces hardened in any suitable manner.

Figure 1:
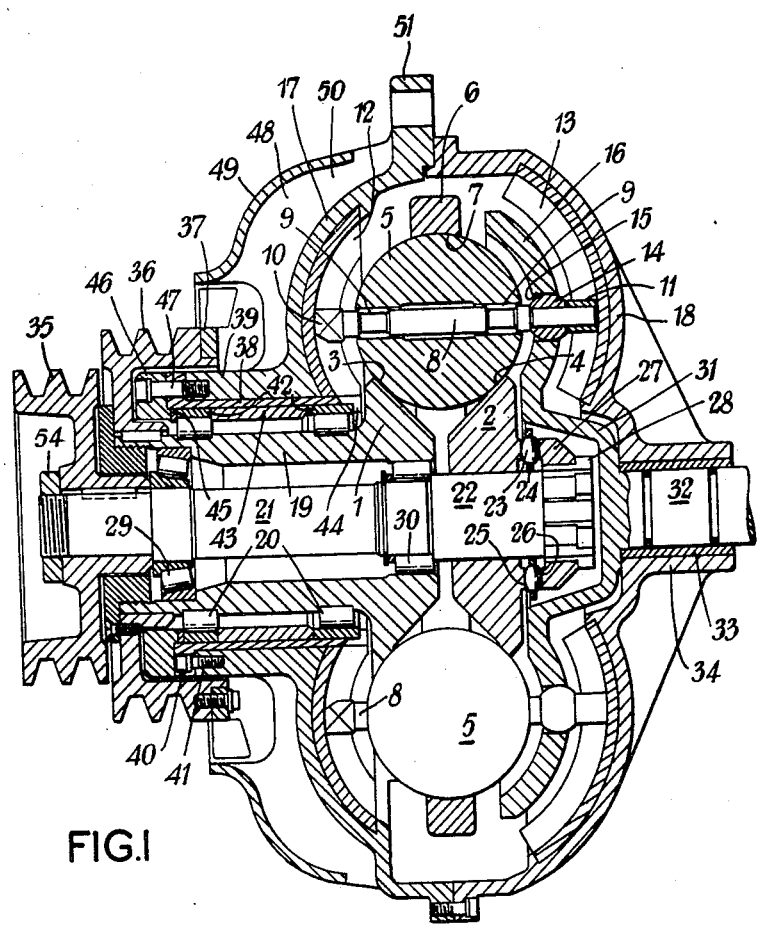
Fig. 1 is a longitudinal section substantially on the line A—A, Fig. 2, illustrating one embodiment of friction drive transmission unit according to the invention.
Figure 2:
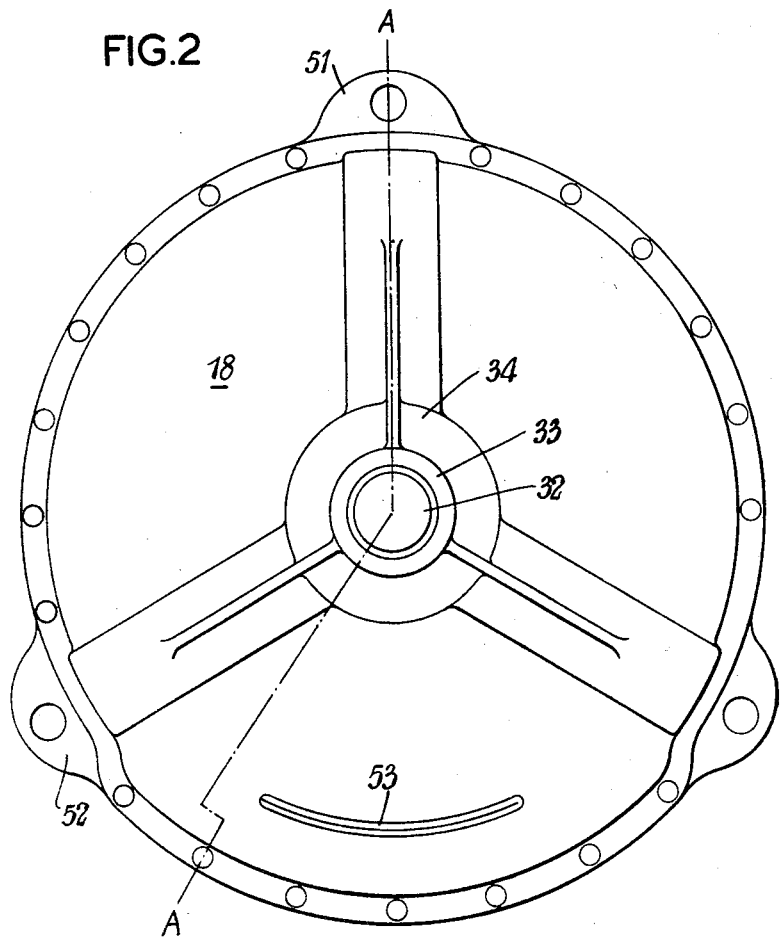
Fig. 2 is a part end elevation of the cover plate end of the casing.

The casing may be provided at the top with means, such as a lug 51 by which the unit may be mounted so as to be capable of angular adjustment for drive-tensioning purposes, means such as a second lug 52 (Fig. 2) being provided for the connection of an adjuster rod or the like. In order that the oil level in the casing may be observed accurately irrespective of angular adjustment of the unit about the axis of the lug 51, an arcuate window 53 (Fig. 2) is provided at the lower part of the cover plate structure 18 so as to be concentric with the axis of the unit.

In assembling the parts the nut 54 on the outer end of the shaft 21 is adjusted to displace the pulley 35 and the inner race of the thrust bearing 29 on the shaft so that the friction drive rims 3, 4 of the elements 1, 2 engage the spherical bodies with a suitable degree of preload to ensure operation of the automatic pressure-adjusting means. On slacking off the nut 54, the element 2 may be displaced axially away from the element 1 to facilitate removal or replacement of the retaining ring 6 and/or the spherical bodies 5.

It will be readily appreciated that the improved construction of transmission unit not only facilitates economic production but also offers other important advantages. Thus, an oil-tight casing is provided in combination with a mounting for the "iris" plate, which is particularly conducive to sensitive operation. Moreover, in view of the restricted angular movement of the "iris" plate about its axis in the course of operation, it is a simple matter to hermetically seal the casing to prevent oil leakage along the spindle or member 32, e.g. by the use of a flexible diaphragm seal which may be of the bellows type. The provision of such a seal would enable the unit to be operated with its axis vertical and the pulleys 35, 36 disposed at the top. Furthermore, by removing the cover plate structure 18, together with the "iris" plate, the rotatable assemblage of the transmission is accessible for inspection and for replacement of components, such as the retaining ring 6 or spherical bodies 5 without disturbing the mounting of the assemblage in the main end part 17 of the casing. Consequently, any inspection and repair, which may be required under normal service conditions, may be readily carried out in situ.

It will be understood that the invention is not limited to the particular details of constructon hereinbefore described. For example, the element 2 may be fixed on the shaft 21 or integral therewith, and the element 1 may be rotatably and axially displaceable on the shaft 19, in which case the pressure-adjusting means is disposed between the element 1 and an abutment on the shaft 19. Alternatively, the pressure-adjusting means may be disposed at any other suitable position, e.g., between the pulleys 35, 36, so as to react between the shafts, in which case both elements 1, 2 would be fixed in relation to their respective shafts. Furthermore, the arrangement of driving and driven elements and pressure member acting on the spherical bodies in opposition may be inverted, in which case the driving and driven elements would be of disc-like formation with concentric peripheral flanges extending at the outer side of the said spherical bodies and having inturned flanges engaging said bodies at axially spaced positions, the pressure member being in the form of a freely rotatable ring or disc disposed within the set of spherical bodies and the arcuate guides for the ends of the axles of the spherical bodies adjacent said disc-like elements being supported by a cage or like structure extending between the spherical bodies. Furthermore, the casing may be constructed of three parts, i.e. a main end part supporting the rotatable elements of the transmission, a cover plate structure supporting the "iris" plate, and an intermediate annular part. The pulleys 35, 36 may be replaced by chain sprockets and the construction may be otherwise modified in any suitable manner within the scope of the appended claims.

I claim:

1. An infinitely variable friction drive transmission unit of the kind referred to, wherein the driving and driven elements are provided on two concentric shafts, namely, an outer tubular shaft journalled in a main end part of a casing of the unit, and an inner shaft extending through the outer shaft and rotatably supported concentrically therewith independently of an opposite end part or cover plate structure of the casing so that said main end part of the casing supports the whole of the rotatable assembly of the transmission unit, said elements being pressed axially towards one another by the action of automatic pressure-adjusting means arranged so that torsional stress dependent on the load transmitted imparts proportional axial thrust acting to press the driving and driven elements towards one another, the opposite axial thrust forces on the said elements being resolved in the concentric shaft assembly so that the casing is not stressed thereby.

2. An infinitely variable friction drive transmission unit according to claim 1, wherein one of said elements is fixedly mounted on the respective shaft, and the other element is mounted to be rotatable and axially displaceable with respect to its shaft, the automatic pressure-adjusting means being disposed between the axially displaceable element and an abutment on the respective shaft.

3. In an infinitely variable friction drive transmission unit of the kind referred to, wherein the coaxial driving and driven elements are provided on concentric outer and inner shafts to engage at their peripheries a circumferentially spaced set of spherical bodies disposed between peripheral friction drive rims of the elements and an outer retaining ring, the outer shaft being tubular and the inner shaft extending therethrough, a construction in which the casing enclosing the co-operating elements of the transmission includes a main end part and an opposite cover plate structure, the said main end part supporting the whole rotatable assembly of the transmission unit, the outer tubular shaft being journalled in bearings in the main part of the casing and being fixedly provided at its inner end with one of said elements, and the inner shaft extending concentrically through the tubular outer shaft being supported concentrically therewith independently of the cover plate structure of the casing, and in which the other of said coaxial elements is so mounted on a portion of the inner shaft extending within the casing as to be rotatable and axially displaceable with respect to said inner shaft, drive between the inner shaft and the element mounted thereon being transmitted by an automatic pressure-adjusting means disposed between an abutment on the inner shaft and the respective element, said pressure-adjusting means being adapted to convert torsional stress into axial thrust so that when drive is being transmitted the coaxial elements are pressed axially towards each other, and a thrust bearing being provided between the inner and outer shafts whereby axial pressure exerted by the automatic pressure-adjusting means reacts through the concentric shafts on said elements and through the spherical bodies without stressing the casing.

4. An infinitely variable friction drive transmission unit according to claim 1, wherein the outer end of the inner shaft is journalled concentrically within the tubular outer shaft by a thrust bearing or bearing assembly of the combined axial and radial thrust type.

5. An infinitely variable friction drive transmission unit according to claim 4, wherein the inner end of the inner shaft is located concentrically with respect to the outer tubular shaft solely by the self-centering action of spherical bodies reacting in conjunction with a pressure member in the form of an outer retaining ring against the friction drive rims of the coaxial driving and driven elements.

6. An infinitely variable friction drive transmission unit according to claim 4, wherein the portion of the inner shaft extending within the casing is journalled in a bearing adjacent the inner end of the outer tubular shaft.

7. An infinitely variable friction drive transmission unit according to claim 1, wherein an "iris" plate is carried by a spindle member coaxial with said inner shaft and extending through an axial boss of the cover plate structure for operation by control means.

References Cited in the file of this patent

UNITED STATES PATENTS

| | | |
|---|---|---|
| 2,127,588 | Erban | Aug. 23, 1938 |
| 2,469,653 | Kopp | May 10, 1949 |
| 2,548,207 | Dunn | Apr. 10, 1951 |
| 2,675,713 | Acker | Apr. 20, 1954 |